BEST AVAILABLE COPY

W. H. Johnson.

Shovel Plow.

No. 299. A. L. Patented Oct. 2, 1860.

Filling box

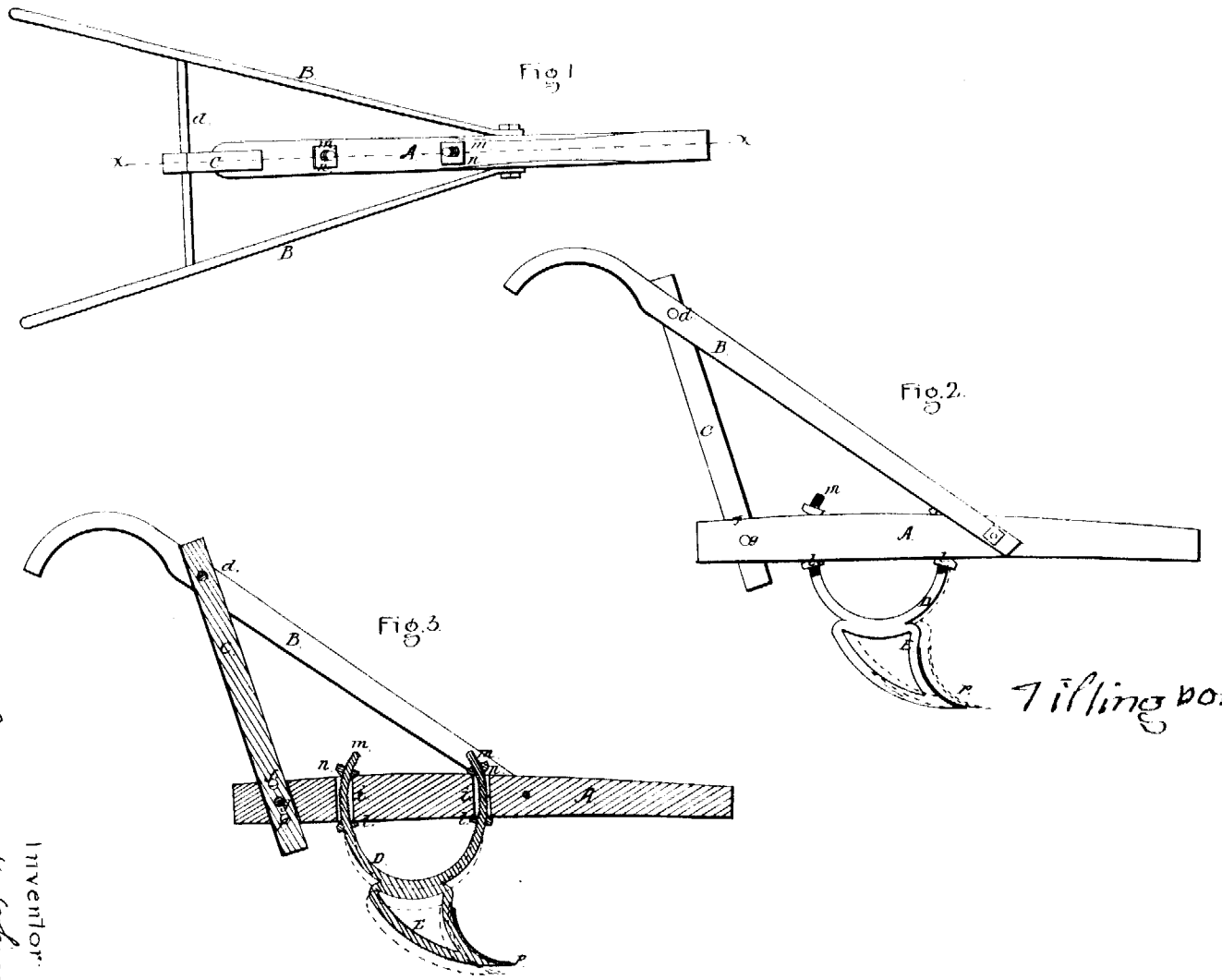

Witnesses:

R. F. Osgood

E. N. Smith

Inventor:

William H. Johnson

By his Atty

J. S. Wurm

No. 299, to original Letters Patent No. 27,188.—*Improvement in Plowshs.*—What I is the segmental ring D, provided with the screw threads and nuts for adjusting it beam A, in combination with the share piece E, constructed, arranged, and operating stantially as and for the purposes herein specified.

WILLIAM H. JOHNS

N. PETERS, PHOTO-LITHOGRAPHER, WASHINGTON, D. C.

UNITED STATES PATENT OFFICE.

WILLIAM H. JOHNSON, OF RICHMOND, ARKANSAS.

IMPROVEMENT IN PLOWS.

Specification forming part of Letters Patent No. 27,188, dated February 14, 1860; Additional Improvement No. 299, dated October 2, 1860.

*To all whom it may concern:*

Be it known that I, WILLIAM H. JOHNSON, of Richmond, in the county of Sevier and State of Arkansas, have made certain Improvements in Plows, additional to those invented by me for which Letters Patent of the United States were granted to myself and J. B. Bellah, as assignees, bearing date the 14th day of February, 1860; and I do hereby declare that the following is a full and exact description of said additional improvements, reference being had to the accompanying drawings, making part of this specification—

Figure 1 being a plan of a plow constructed with the said additional improvements; Fig. 2, a side elevation thereof; Fig. 3, a longitudinal vertical section thereof in the plane indicated by the line *x x*, Fig. 1.

Like letters designate corresponding parts in all the figures.

The beam A may be constructed, as represented and described in the original Letters Patent to which these improvements are additional, or in any suitable manner, of iron or wood. The handles B B, standard C, stretcher-bar *d*, and adjusting holes and pins *f f* and *g* are also the same as in the original Letters Patent.

Instead of employing an entire adjusting-ring, as in the original Letters Patent, I dispense with the upper part thereof, leaving only the segment of a ring, as shown in the accompanying drawings, and instead of employing a share-standard extending up through the ring and adjustable therein, as in said original invention, I employ a brace-standard or share-piece, E, as represented.

The construction, arrangement, and operation of these modified parts are specifically described as follows:

If the beam is made of one solid piece, as shown in the drawings, two oblong apertures, *i i*, are formed vertically therein to receive the two horns *m m* of the segmental ring, and are of proper size and form to allow the required adjustments of the same therein. The horns or arms *m m* of the segmental ring are provided with screw-threads, as represented, to a sufficient extent thereon to receive nuts *n n* above the beam and nuts *l l* below the beam at the same time, and to allow also the fullest amount of adjustment required. The vertical adjustments of the share are effected by turning all the nuts *l l n n* equally in the proper directions, and the angular adjustments are produced by turning the nuts in such a manner as to lower one horn of the segmental ring as much as the other is raised. A combined vertical and angular adjustment is effected by such a relative turning of all the nuts as obviously to produce the result required, a specific direction for doing which is not necessary. The opposite nuts, *l n*, are screwed tightly against the beam, thereby holding the segmental ring firmly in place, and also preventing the splitting of the beam when made of wood.

The brace-standard or share-piece E is generally constructed, in connection with the segmental ring D, by selecting a piece of bar-iron of proper dimensions, another piece of the same iron having been taken for the said segmental ring. The two pieces are then welded together, near the middle of each, to the extent of six or eight inches of the length of said pieces. Then the upper piece is bent into the form of the segmental ring and the lower piece is bent round into substantially the form shown in the drawings, and finally the two ends are welded together at the front point, and properly shaped to receive any point or share *p* desired; but it is not necessary to permanently attach the share-piece E to the segmental ring D. It may be bolted or otherwise fastened to the same, so as to be removed therefrom when required.

Some of the advantages of the present construction over that described in the original Letters Patent are superior lightness, cheapness, and compactness, and facility of making at a common forge, while the ring originally described cannot well be made, except at a foundry or machine-shop, yet in some instances the construction originally described may be preferred, especially where superior strength and firmness may be necessary. Therefore, while I wish to be secured in the use of the improvement or modification herein described, I do not intend to discard entirely the original construction, the two not being incompatible with each other.

What I claim distinctive in the herein-described improvement as my invention, and desire to secure by Letters Patent, is—

The segmental ring D, provided with the screw-threads and nuts for adjusting it in the beam A, in combination with the share-piece E, constructed, arranged, and operating substantially as and for the purposes herein specified.

In witness that the above is a true specification of my additional improvement in the plow patented to myself and J. D. Bellah, as assignes, February 14, 1860, I hereunto set my hand this 26th day of April, 1860.

WILLIAM H. JOHNSON.

Witnesses:

S. K. INGRAM,

P. K. BOWMAN.